United States Patent
Wu et al.

(10) Patent No.: US 9,235,313 B2
(45) Date of Patent: Jan. 12, 2016

(54) EFFICIENT MOTION ESTIMATION FOR REMOTE DESKTOP SHARING

(75) Inventors: Ronghua Wu, Albany, NY (US); Wei Jia, San Jose, CA (US)

(73) Assignee: Google Inc., Mountain View, CA (US)

( * ) Notice: Subject to any disclaimer, the term of this patent is extended or adjusted under 35 U.S.C. 154(b) by 797 days.

(21) Appl. No.: 13/348,103

(22) Filed: Jan. 11, 2012

(65) Prior Publication Data

US 2015/0199074 A1   Jul. 16, 2015

(51) Int. Cl.
*G06F 3/0481* (2013.01)
*G06F 3/14* (2006.01)
*G06F 9/44* (2006.01)
*H04N 7/15* (2006.01)

(52) U.S. Cl.
CPC ............ *G06F 3/0481* (2013.01); *G06F 3/1454* (2013.01); *G06F 9/4445* (2013.01); *H04N 7/15* (2013.01)

(58) Field of Classification Search
USPC .......................................... 715/794; 345/781
See application file for complete search history.

(56) References Cited

U.S. PATENT DOCUMENTS

| | | | |
|---|---|---|---|
| 6,148,033 A * | 11/2000 | Pearlstein et al. | 375/240.16 |
| 6,573,915 B1 * | 6/2003 | Sivan et al. | 715/781 |
| 7,114,129 B2 | 9/2006 | Awada et al. | |
| 7,751,482 B1 | 7/2010 | Srinivasan et al. | |
| 8,774,536 B1 | 7/2014 | Jia et al. | |
| 2004/0001544 A1 * | 1/2004 | Mehrotra | 375/240.1 |
| 2009/0237728 A1 | 9/2009 | Yamamoto | |
| 2009/0307428 A1 | 12/2009 | Schmieder et al. | |
| 2010/0026608 A1 | 2/2010 | Adams et al. | |
| 2010/0235583 A1 | 9/2010 | Gokaraju et al. | |
| 2011/0010629 A1 | 1/2011 | Castro et al. | |
| 2011/0103465 A1 * | 5/2011 | Chang et al. | 375/240.02 |
| 2011/0219331 A1 | 9/2011 | DeLuca et al. | |

OTHER PUBLICATIONS

Mozilla. "Introduction to Video Coding Part 1: Transform Coding", published online at: [http://people.xiph.org/~tterribe/pubs/lca2012/auckland/intro_to_video1.pdf], retrieved Mar. 13, 2012, 171 pages.

* cited by examiner

*Primary Examiner* — Peiyong Weng

(57) ABSTRACT

This disclosure relates to systems and methods for estimation of motion in a frame as compared to a reference frame based upon knowledge of windows in the frame and reference frame.

23 Claims, 12 Drawing Sheets

EFFICIENT MOTION ESTIMATION FOR REMOTE DESKTOP SHARING

TECHNICAL FIELD

This disclosure generally relates to systems and methods that facilitate efficient motion estimation for remote desktop sharing.

BACKGROUND

Remote desktop sharing involves capturing image frames of a remote desktop and transmitting frames (such as in the form of a video), typically employing an encoder/decoder, to a client desktop. The amount of data representing the captured frames can be extremely large. Further, transmitting digital media information over communication networks can consume large amounts of bandwidth. The cost of transmitting data from one location to another is a function of number of bits transmitted per second. Typically, higher bit transfer rates are associated with increased cost. Higher bit rates can also progressively add to required storage capacities of memory systems, thereby increasing storage cost. Thus, at a given quality level, it can be much more cost effective to use fewer bits, as opposed to more bits, to store digital images and videos.

It therefore can be desirable to compress media data for recording, transmitting, or storing. For a typical compression scheme, achieving higher media quality requires more bits used, which can in turn increase cost of transmission and storage. While lower bandwidth traffic is desired so is higher quality media.

An encoder is a device capable of encoding (e.g., coding) (and sometimes decoding) digital media data. A decoder is a device capable of decoding digital media data. An encoder generally employs a codec for coding and/or decoding digital media data. The term codec is derived from a combination of the terms code and decode, or the terms compress and decompress. A variety of codecs are commercially available. Generally speaking, for example, codec classifications include discrete cosine transfer codecs, fractal codecs, and wavelet codecs. An encoder or codec, by encoding the digital media data, can reduce the number of bits required to transmit signals thereby reducing associated transmission costs.

One part of the encoding process typically involves using motion estimation to facilitate encoding of digital media data. In most cases, consecutive frames in a sequence of frames will be relatively similar except for movement of an object(s) within a frame from one frame to the next frame. Motion estimation techniques take advantage of similarities between consecutive frames in order to more efficiently encode a frame. For instance, an encoder, employing a motion estimation technique, can use a previous frame as a reference frame when encoding a current frame. The encoder generates motion vectors for the current frame based on the reference frame, which can be a reconstructed video frame. The encoder identifies differences between the reference frame and current frame, and codes the portions of the current frame that are different from the reference frame without having to code the portions of the current frame that are unchanged from the reference frame. This can thereby make the encoding process and decoding process more efficient.

Precise motion estimation in frame compression can be desirable to attain desired quality and efficiency of the encoder. Typically, the more precise the motion estimation, the less complicated residual data can be for encoding of digital media content, the lower the bit rate, and the better the encoding quality.

However, the computational complexity of motion estimation generally can be very high, thereby making motion estimation a primary, time-consuming portion of encoding.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed description of the various embodiments that follow in the disclosure.

In accordance with an implementation, a window analyzing component identifies respective location, size, and z-order of at least one window captured in a frame; a tracking component tracks relocation or re-sizing of the at least one window over a plurality of frames; and a motion estimation component estimates motion of at least one motion compensation unit in the frame as a function of its location with respect to the at least one window.

In accordance with another non-limiting implementation, respective location, size, and z-order of at least one window captured in a frame are identified. Relocation or re-sizing of the at least one window over a plurality of frames is tracked and motion of at least one motion compensation unit in the frame as a function of its location with respect to the at least one window is estimated.

These and other implementations and embodiments are described in more detail below.

DETAILED DESCRIPTION

Overview

Figure 1:
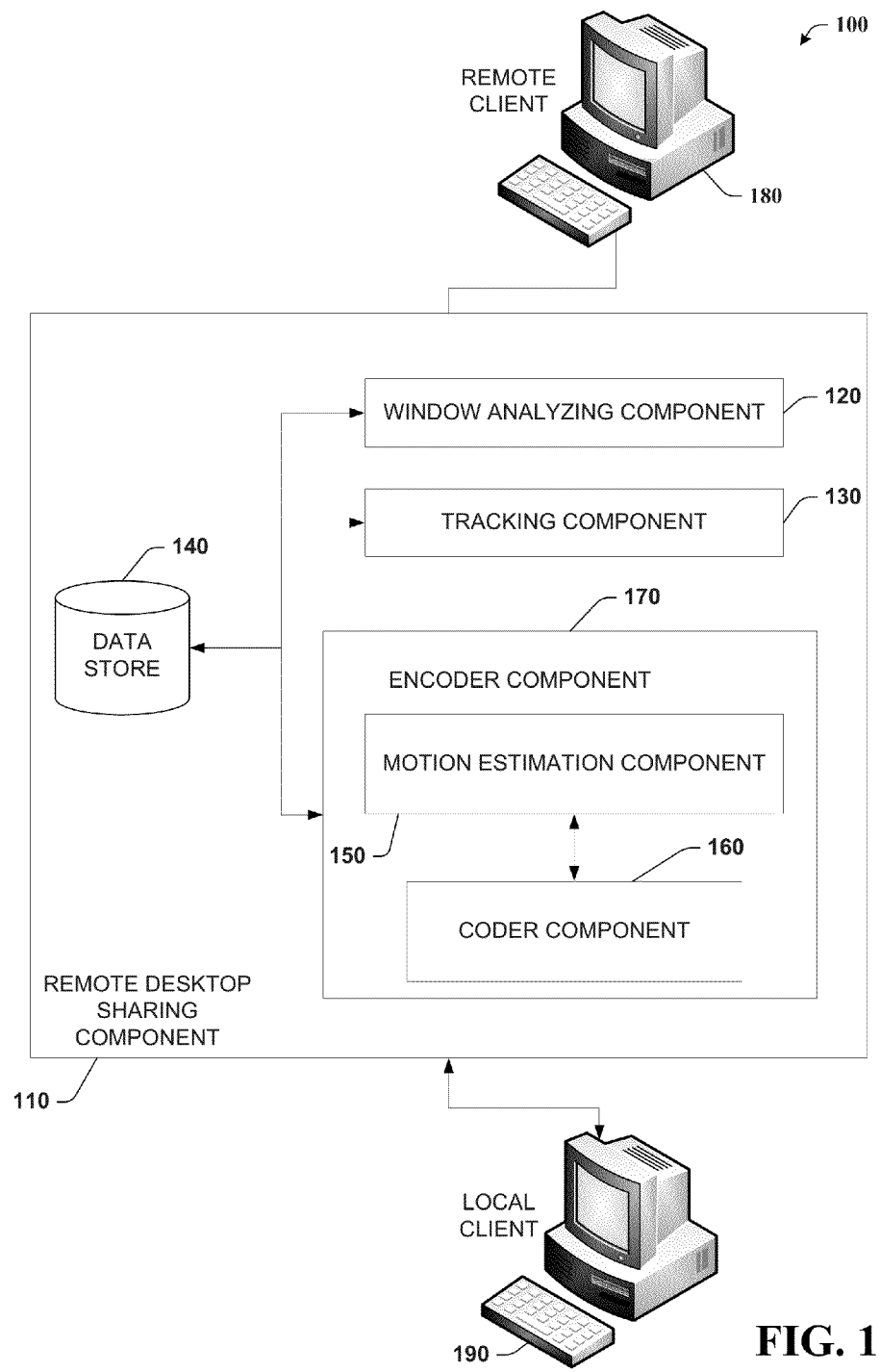
FIG. 1 illustrates a block diagram of an exemplary non-limiting system that provides desktop screen captures from remote client to local client.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of this disclosure may be practiced without these specific details, or with other methods, components, materials, etc. In other instances, well-known structures and devices are shown in block diagram form to facilitate describing this disclosure.

Motion estimation is often used to facilitate encoding digital media data (e.g., desktop sharing content). During the motion estimation process, motion vectors for a current raw frame of a frame sequence can be generated based on a reference frame, which is typically a prior frame in the sequence. Precise motion estimation in frame compression can be desirable to attain desired quality and efficiency of the encoder. Typically, the more precise the motion estimation, the less complicated residual data can be for encoding of content, the lower the bit rate, and the better the encoding quality. However, motion estimation is generally one of the most computing and time intensive portions of the encoding process.

A motion vector generally represents motion estimation between a current raw frame and a reference frame. Considering the high correlation between a reference frame and its raw frame, it is possible to obtain a good motion estimate based on a raw reference frame, and then refine the motion estimation when a reconstructed reference frame is available if desired. Accordingly, in one implementation, an initial motion estimation can be generated using raw frame data. Certain other coding techniques performed during video encoding can use motion vectors based directly on the initial motion estimation or refined motion vectors based on a reconstructed reference frame when the reconstructed reference frame is available. The decision to use motion vectors based on the initial motion estimation or refined motion vectors based on a reconstructed reference frame can be based on variable factors, such as, for example, available bandwidth, available computing cycles, statistics of previously encoded frames/slices, etc.

Typically, block-based motion compensation can be used in motion estimation. Block-based motion compensation takes into account that much of what makes up a new frame in a video sequence can be found in an earlier frame, but perhaps in a different location. One implementation divides a frame into a series of macroblocks. A macroblock is a set of pixels of a frame within a defined area, non-limiting examples of which are, a 16 by 16 pixel block, an 8 by 8 pixel block, or a 4 by 4 pixel block. Performing a search for the macroblocks of a current frame, a new frame can be composed or 'predicted' with respect to a reference frame by looking for a macroblock in the reference frame that matches a macroblock in a current frame. If a matching macroblock is found, the motion vector of the matching macroblock in the reference frame to the macroblock in the current frame is associated with the current frame.

In remote desktop sharing, unlike in conventional video encoding, motion vectors of a frame of a desktop screen capture are closely related to movement of windows on the desktop. This movement, which includes changes in location and/or size, of the windows is knowable. Information about windows in a desktop is typically available from the operating system, for example, through application programming interfaces (APIs). As such, for a macroblock that is located in a window of a current frame, the window location and size can be employed to provide a better estimate of a potential motion vector and/or suggested search area for a matching block with respect to the same window in a reference frame.

Disclosed in one or more non-limiting embodiments described below are aspects relating to motion estimation for an encoder based upon knowledge of locations and sizes of desktop windows in captured frames.

Referring now to the drawings, FIG. 1 depicts a system 100 that provides desktop screen captures from remote client 180 to local client 190. System 100 includes a remote desktop sharing component 110 that captures frames of the desktop screen from remote client 180, encodes the frames and communicates the frames to local client 190 over a network. Furthermore, remote desktop sharing component 110 can receive input from local client 190 to control the desktop on remote client 180.

Figure 11:
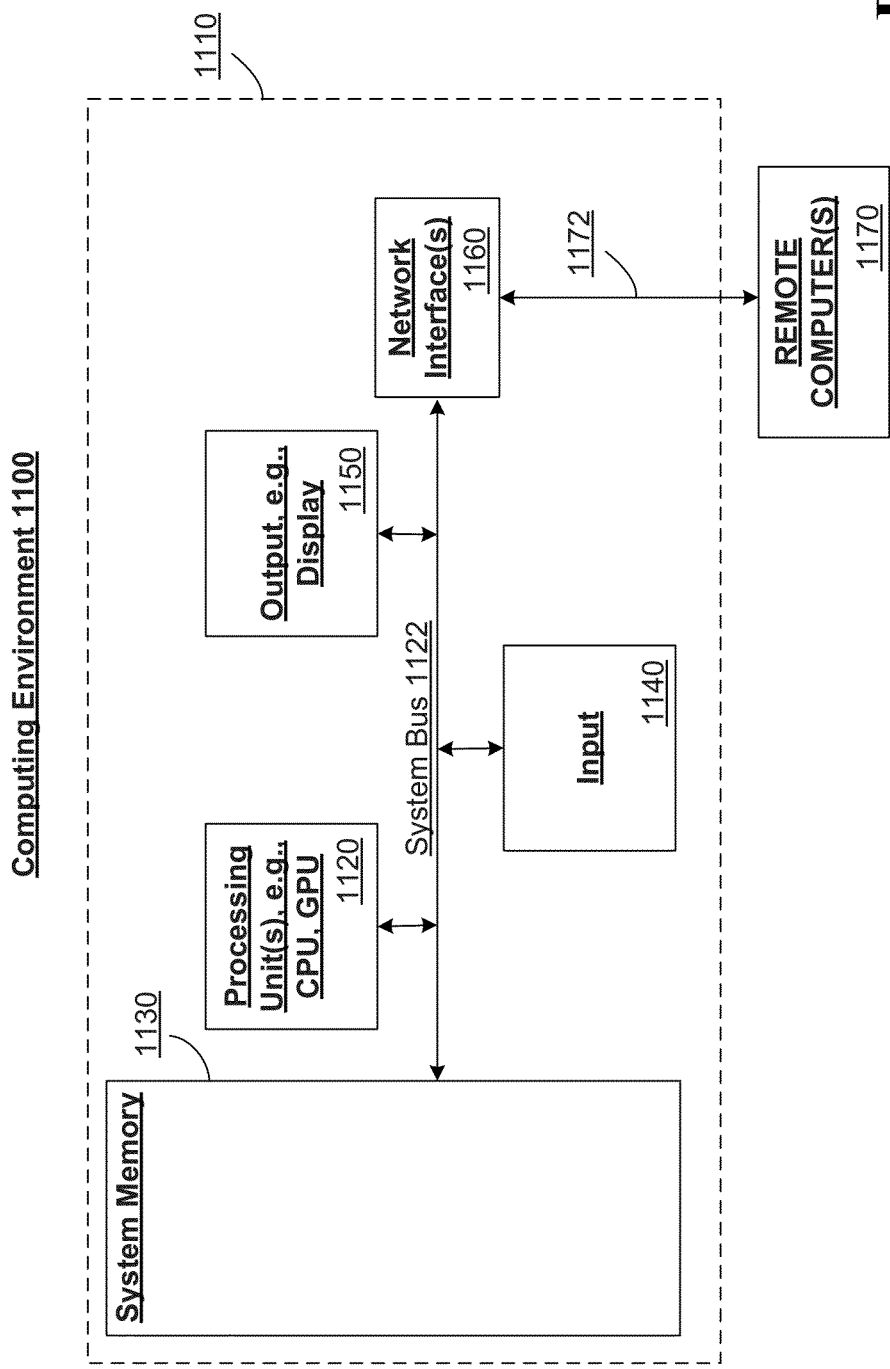
FIG. 11 is a block diagram representing an exemplary non-limiting computing system or operating environment in which the various embodiments may be implemented.

Remote desktop sharing component 110 includes a memory that stores computer executable components and a processor that executes computer executable components stored in the memory, a non-limiting example of which can be found with reference to FIG. 11. In one implementation, remote desktop sharing component 110 can be incorporated into remote client 180. Alternatively, remote desktop sharing component 110 can be located on a server communicating via a network to remote client 180. Remote desktop sharing component 110 communicates via a network to local client 190. It is to be appreciated that while only one local client 190 is depicted sharing the desktop on remote client 180, there can be any number of local clients 190 sharing the desktop on remote client 180, and remote desktop sharing component 110 can communicate captured frames from remote client 180 to a plurality of local clients 190 concurrently.

Remote desktop sharing component 110 includes a window analyzing component 120 that captures frames of the desktop screen on remote client 180 and determines window information in the frame. Remote desktop sharing component 110 further includes a tracking component 130 that logs captured frames and determined window information. In addition, remote desktop sharing component includes an encoder component 170 that determines motion vectors associated with captured frames, and employs the captured frames and motion vectors to generate encoded data for communication to local client 190. Additionally, in FIG. 1, remote desktop sharing component 110 includes a data store 140 that stores data generated by window analyzing component 120, tracking component 130, and encoder component 170. Data store 140 can be stored on any suitable type of storage device, non-limiting examples of which are illustrated with reference to FIGS. 10 and 11. Data store 140 may also be external, but coupled, to remote desktop sharing component 110.

With continued reference to FIG. 1, window analyzing component 120 periodically captures a desktop screen frame of remote client 180. In a non-limiting example, this can be performed at a regular interval based upon a predetermined frame rate, for example, based upon quality, type of encoder/codec, performance, etc. Window analyzing component 120 obtains window information regarding windows in the captured frames. For example, referring to FIG. 2, a remote desktop is depicted with WINDOW1, WINDOW2, and WINDOWN. It is to be appreciated that a desktop can have any number N windows, where N is an integer. In this example, WINDOWs 1 and N are completely visible and WINDOW2 is partially visible.

Figure 2:
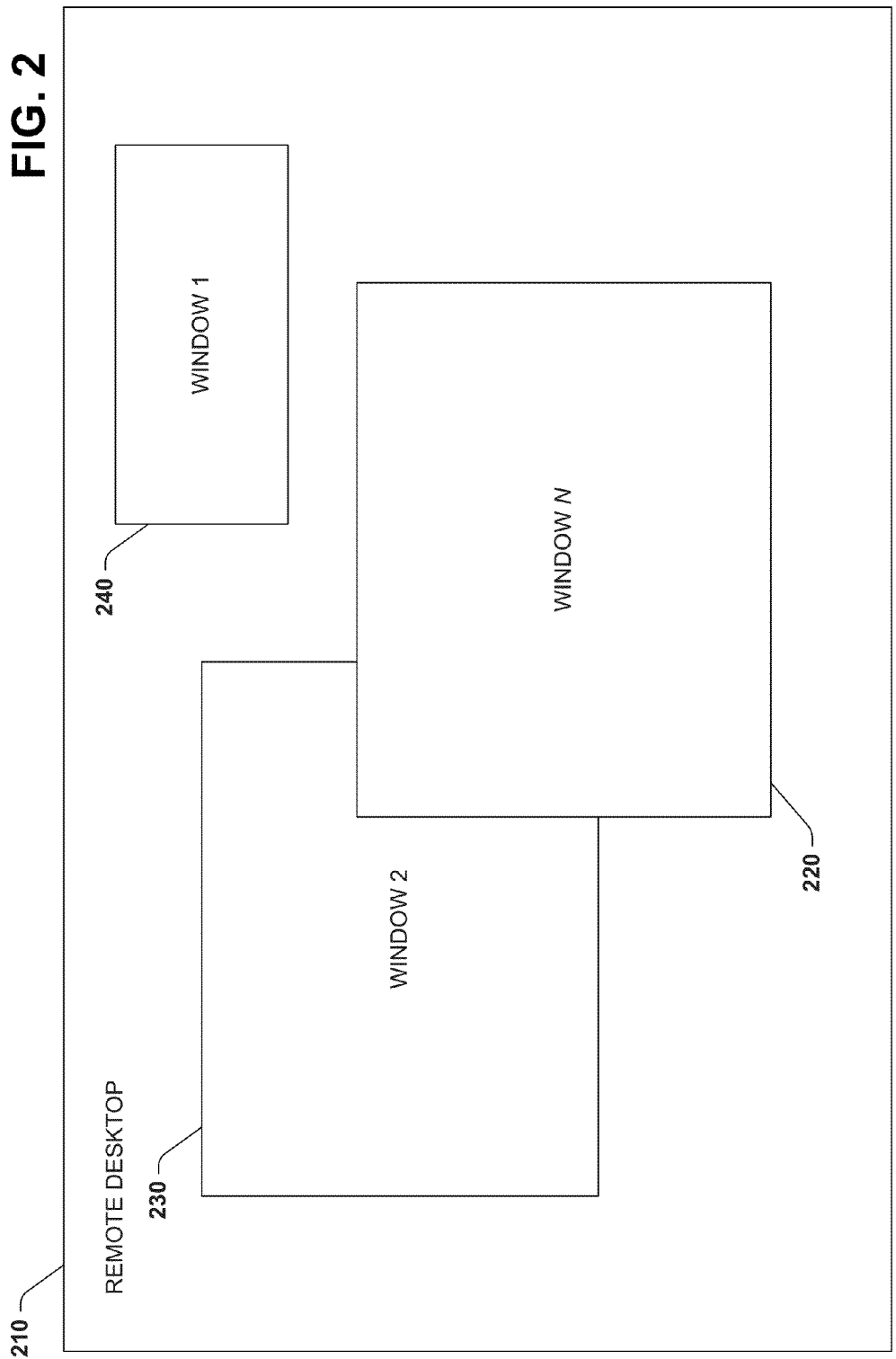
FIG. 2 illustrates an exemplary non-limiting remote desktop with several windows.
Figure 3:
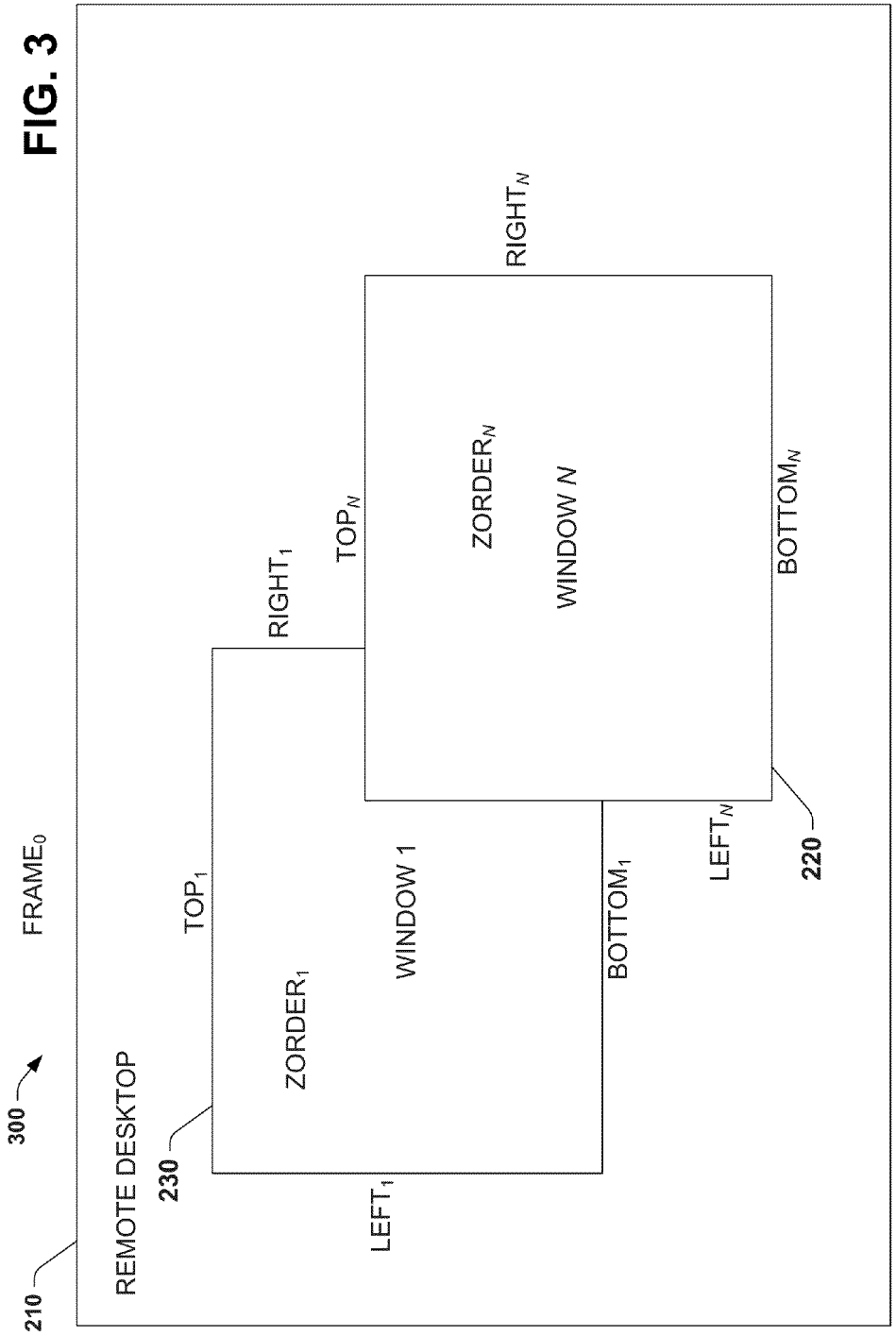
FIG. 3 illustrates an exemplary non-limiting remote desktop with several windows showing window information for each window.

Referring to FIG. 3 is depicted an example captured $FRAME_0$ by window analyzing component 120 of the desktop screen of FIG. 2. Window analyzing component 120 obtains window information for each WINDOW 1, 2, and N that can include:

ID, which is a unique identifier for the window,

LEFT, which indicates a position of the left edge of the window on the desktop with respect to an x-axis, TOP, which indicates a position of the top edge of the window on the desktop with respect to a y-axis, RIGHT, which indicates a position of the right edge of the window on the desktop with respect to an x-axis, BOTTOM, which indicates a position of the bottom edge of the window on the desktop with respect to a y-axis, ZORDER, or z-order, which indicates the window's position in a stack of windows. This window stack is oriented along an imaginary z-axis extending outward from the screen. The window at the top of the z-order is in front of all other windows. The window at the bottom of the z-order is behind all other windows.

ISNEW, which indicates whether the window is present in a reference frame. While window analyzing component 120 is depicted outside of encoder component 170, it is to be appreciated that window analyzing component 120 can be a part of encoder component 170.

Continuing with reference to FIG. 3, window analyzing component 120 obtains window information for WINDOWN 220 including ($ID_N$, $TOP_N$, $LEFT_N$, $RIGHT_N$, $BOTTOM_N$, $ZORDER_N$, $ISNEW_N$). In this example, $ID_N$ indicates the identifier for WINDOWN 220, and $LEFT_N$, $RIGHT_N$, $TOP_N$, and $BOTTOM_N$ indicate the respective x-axis and y-axis positions on remote desktop 210 for the respective edges of WINDOWN 220. $ZORDER_N$ is set to indicate the relative z-axis position of WINDOWN 220, in this case relative to WINDOW 1. For example, $ZORDER_N$ may be set to a value of "1" if WINDOWN 220 is the active window on remote desktop 210 indicating its position as topmost window. Given that $FRAME_0$ represents an initial remote desktop screen capture, there is no reference frame. As such, ISNEW would be set to a value, such as "true" or "1", indicating that WINDOWN 220 is not present in a reference frame. Window information is also obtained by window analyzing component 120 for WINDOW1 230. Additionally, window analyzing component 120 determines if a window is not visible based upon the ZORDERs, locations, and sizes of the windows in the frame, and could not maintain windows information for a frame for windows that are not at least partially visible in that frame. For example, if there were a WINDOWN+1 in $FRAME_0$ that had a ZORDER indicating that is was behind WINDOW1 and located completely within the boundary of WINDOW1, then WINDOWN+1 would not be visible and, in one implementation, windows information would not be maintained for WINDOWN+1 for $FRAME_0$.

Figure 4:
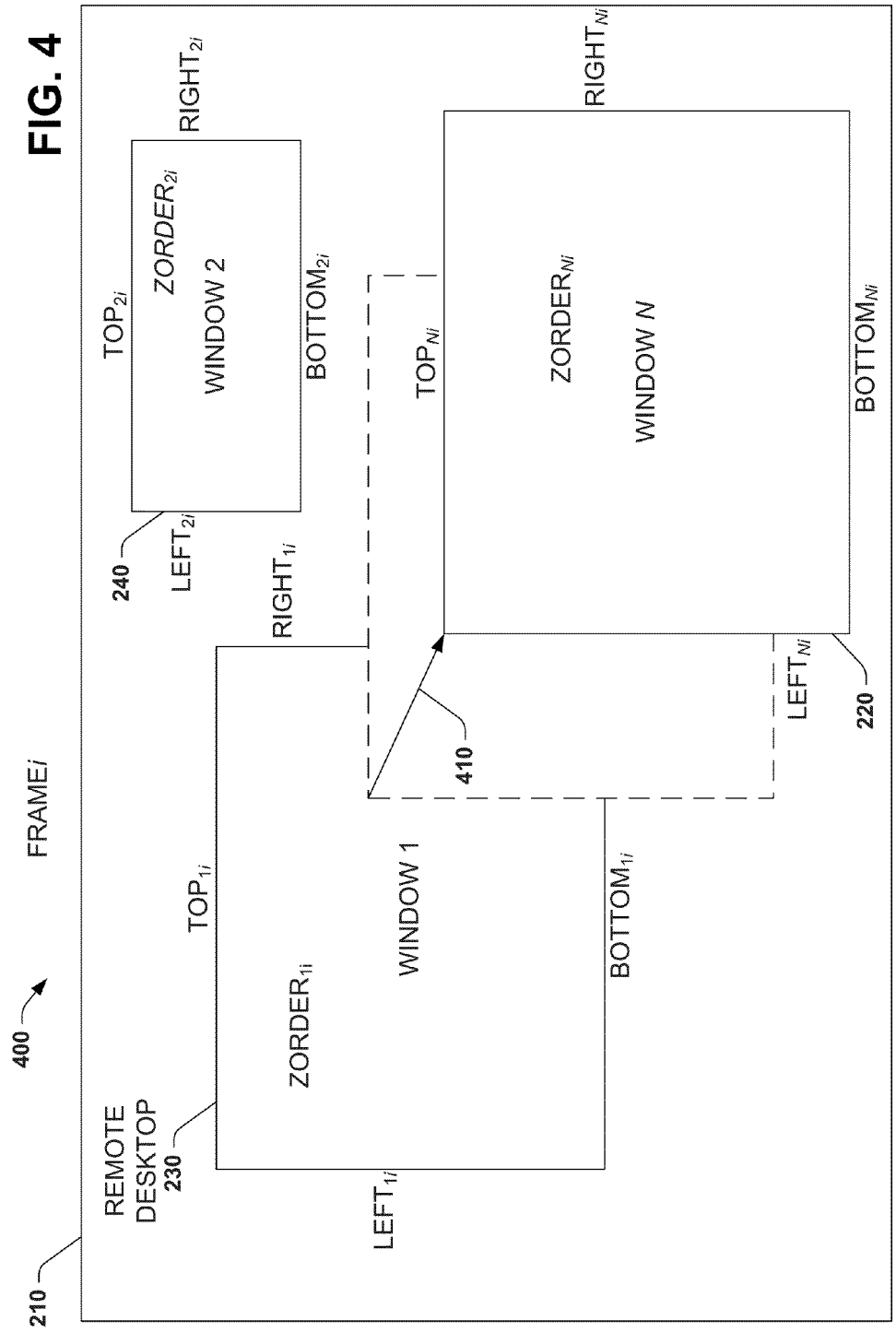
FIG. 4 illustrates an exemplary non-limiting remote desktop with several windows showing window information for each window where one window has been relocated.

Referring to FIG. 4, there is depicted an example captured $FRAME_i$ of remote desktop 210, where i is an integer. Any number i of frames can be captured. In this example, WINDOWN 220 is moved by a vector 410. As such, window analyzing component 120 obtains window information for WINDOWN 220 including $ID_{Ni}$, $TOP_{Ni}$, $LEFT_{Ni}$, $RIGHT_{Ni}$, $BOTTOM_{Ni}$, $ZORDER_{Ni}$, $ISNEW_{Ni}$. In this example, $ID_{Ni}$ indicates the identifier for WINDOWN 220, and $LEFT_{Ni}$, $RIGHT_{Ni}$, $TOP_{Ni}$, and $BOTTOM_{Ni}$ indicate the respective x-axis and y-axis positions on remote desktop 210 for the respective edges of WINDOWN 220 in $FRAME_i$. $ZORDER_{Ni}$ may continue to be set to a value of "1" if, for example, WINDOWN 220 is still the active window on remote desktop 210. $FRAME_i$ represents a subsequent frame to $FRAME_0$, which may be designated as a reference frame. As such, $ISNEW_{Ni}$ would be set to a value, such as "false" or "0", indicating that WINDOWN 220 is present in reference $FRAME_0$. Furthermore, FIG. 4 depicts WINDOW2 240, which was not present in reference $FRAME_0$. Therefore, window analyzing component 120 would obtain window information ($ID_{2i}$, $TOP_{2i}$, $LEFT_{2i}$, $RIGHT_{2i}$, $BOTTOM_{2i}$, $ZORDER_{2i}$, $ISNEW_{2i}$) for WINDOW2 and designate a value for $ISNEW_2$, such as "true" or "1", indicating that WINDOW2 240 is not present in a reference $FRAME_0$. Similarly, window information is also obtained by window analyzing component 120 for WINDOW1 230 in $FRAME_i$.

Figure 5:
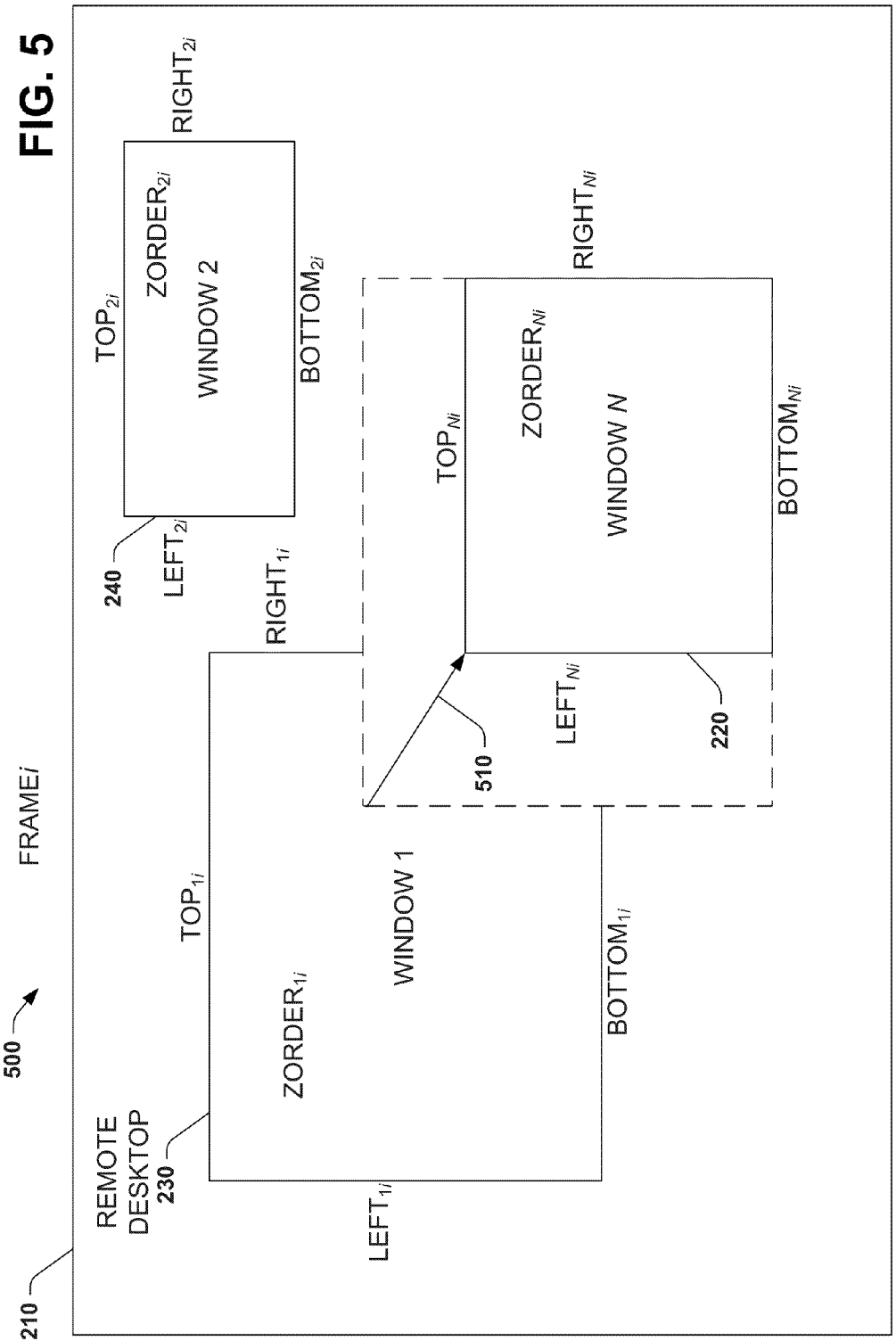
FIG. 5 illustrates an exemplary non-limiting remote desktop with several windows showing window information for each window where one window has been resized.

FIG. 5 depicts an example captured $FRAME_i$ of remote desktop 210 similar to $FRAME_i$ of FIG. 4; however, in FIG. 5, WINDOWN is depicted as having been resized by a vector 510. As described above, window analyzing component 120 obtains window information for WINDOWs 1, 2, and N for $FRAME_i$.

Referring back to FIG. 1, tracking component 130 maintains a list of the captured frames and windows information for, in one implementation, at least partially visible windows associated with each captured frame. For example, tracking component can generate a list showing a sequential order of the captured frames from remote client 180 and associate the window information obtained by window analyzing component 120 for each captured frame. Furthermore, tracking component may indicate in the list which captured frames have been designated as raw reference frames. Furthermore, tracking component 130 can maintain a list of reconstructed frames, where a reconstructed frame is a captured frame that has been encoded by an encoder component 170 and then decoded by encoder component 170 into a reconstructed frame. Tracking component 130 may also indicate in the list which reconstructed frames have been designated as reconstructed reference frames. Determination of which frames are reference frames (either raw or reconstructed) can be based upon the type of encoder/codec. In addition, tracking component 130 maintains window information for reconstructed frames corresponding to their associated captured frames. Tracking component 130 stores the list, frames, and windows information in data store 140. While tracking component 130 is depicted outside of encoder component 170, it is to be appreciated that tracking component 130 can be a part of encoder component 170.

Continuing with reference to FIG. 1, encoder component 170 encodes captured frames. Encoder component 170 includes motion estimation component 150 that estimates motion vectors for captured frames 1 to i. For each frame i, motion estimation component 150 divides $FRAME_i$ into k motion compensation units (MCU), where k is an integer, and then examines each motion compensation unit (also referred to as a macroblock) 1 to k in $FRAME_i$ for a matching macroblock in one or more reference frames 1 to j, where j is an integer, to determine a motion vector for the motion compensation unit k. It is to be appreciated that a reference frame can be a raw reference frame or a reconstructed reference frame, and the choice of reference frame(s) is typically determined by the type of encoder/codec that is employed. In one example embodiment, motion estimation component 150 employs a window based motion estimation process or algorithm, such as disclosed with reference to FIGS. 9A and 9B, for each $MCU_k$ in $FRAME_i$. A windows based motion estimation algorithm takes into account knowledge of windows that exist in frames to perform motion estimation. Motion compensating units and associated motion vectors are tracked and stored with respective frames (e.g. captured frames, encoded captured frames, reconstructed frames, reference frames, or reconstructed reference frames) by tracking component 130.

Encoder component 170 further includes coder component 160 that performs (e.g., executes) one or more encoding-related functions (e.g., data compression) to encode captured frames (e.g., frames of a frame sequence), such as, for example, encoding-related functions other than the motion estimation functions performed by motion estimation component 150. Coder component 160 can employ tracked information from tracking component 130, for example, captured frames, encoded captured frames, window information, reconstructed frames, reference frames, reconstructed reference frames, or motion vectors for the encoding related functions. Encoded captured frames can be stored in data store 140 and maintained in the list by tracking component 130.

FIGS. 6-9B illustrate various methodologies in accordance with certain disclosed aspects. While, for purposes of simplicity of explanation, the methodologies are shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

Figure 6:
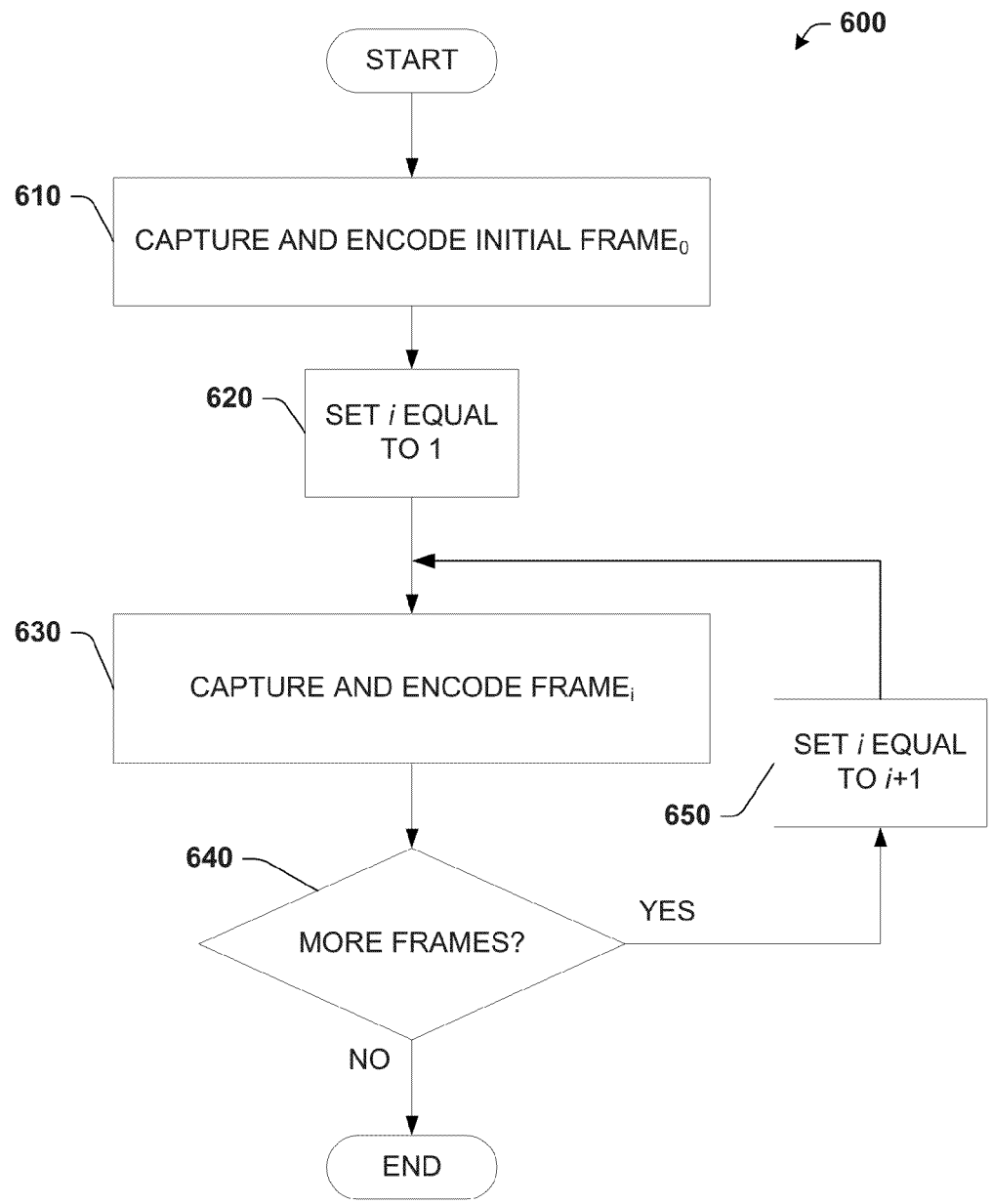
FIG. 6 is an exemplary non-limiting flow diagram for capturing and encoding frames of a remote desktop.

Referring to FIG. 6, an exemplary method 600 for capturing and encoding frames of a remote desktop is depicted. At reference numeral 610, an initial frame 0 is captured of a remote desktop and encoded (e.g., using the remote desktop sharing component 110). At reference numeral 620, a frame counter i is set to 1. At reference number 630, an additional frame i is captured of the remote desktop and encoded (e.g., using a remote desktop sharing component 110). At reference numeral 640, a decision is made whether more frames are to be processed (e.g., using remote desktop sharing component 110). If the decision is "NO" then the process ends. If the decision is "YES" then at reference number 650, the frame counter i is incremented by 1 and the process returns to reference number 630 (e.g., using remote desktop sharing component 110).

Figure 7:
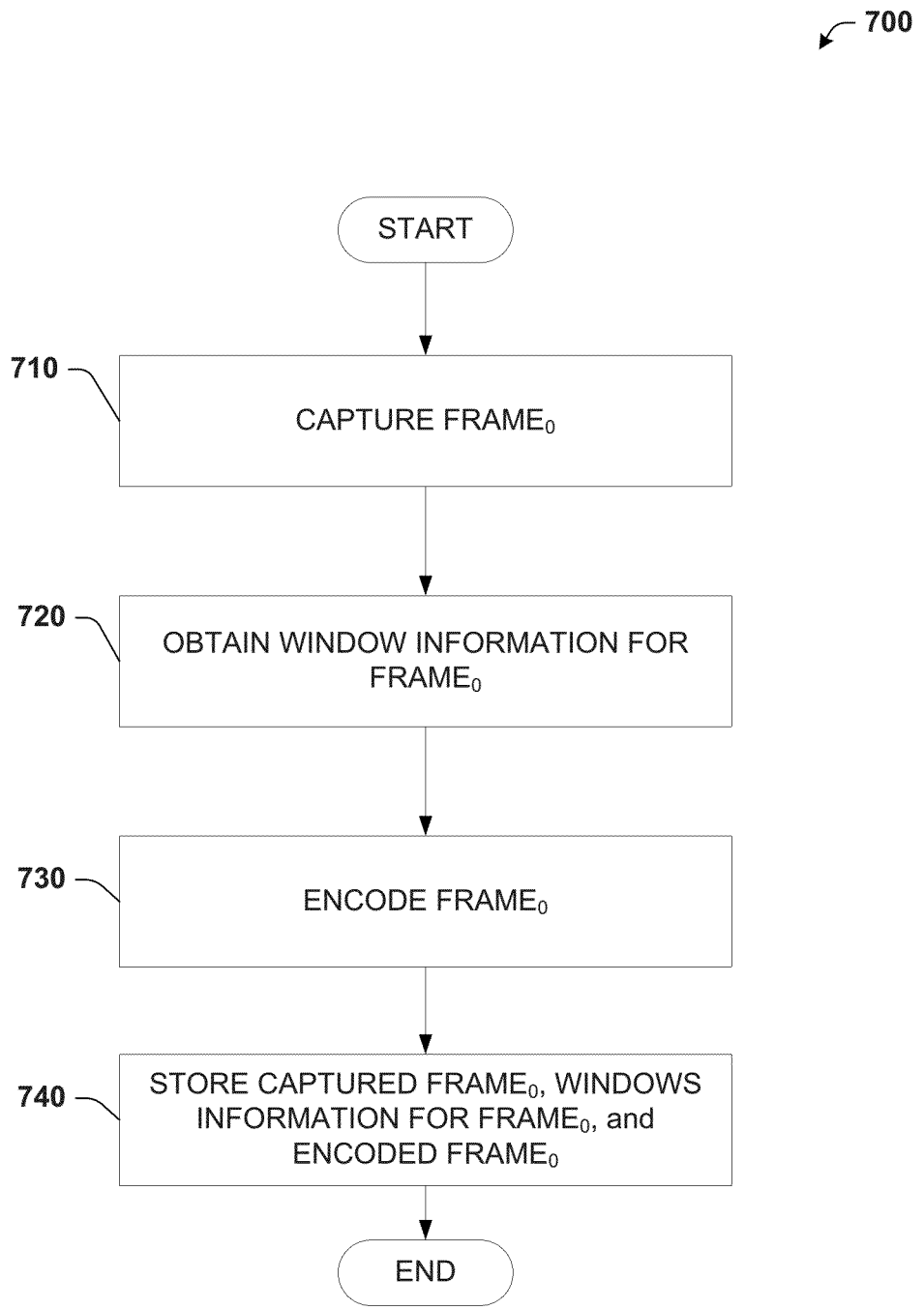
FIG. 7 is an exemplary non-limiting flow diagram for capturing and encoding an initial frame.

Referring to FIG. 7, an exemplary method 700 for capturing and encoding initial frame 0 is depicted. The method 700 may be employed at, for example, 610 in method 600. At reference numeral 710, an initial frame is captured from the remote desktop (e.g., using window analyzing component 120). At reference numeral 720, windows information for windows in the initial frame is determined (e.g., using window analyzing component 120). At reference numeral 730, the initial captured frame 0 is encoded (e.g., using encoder component 170). At reference numeral 740, the captured frame 0, windows information for frame 0, the encoded frame 0, possibly along with a reconstructed frame 0 are tracked and stored (e.g., using tracking component 130 and data store 140).

Figure 8:
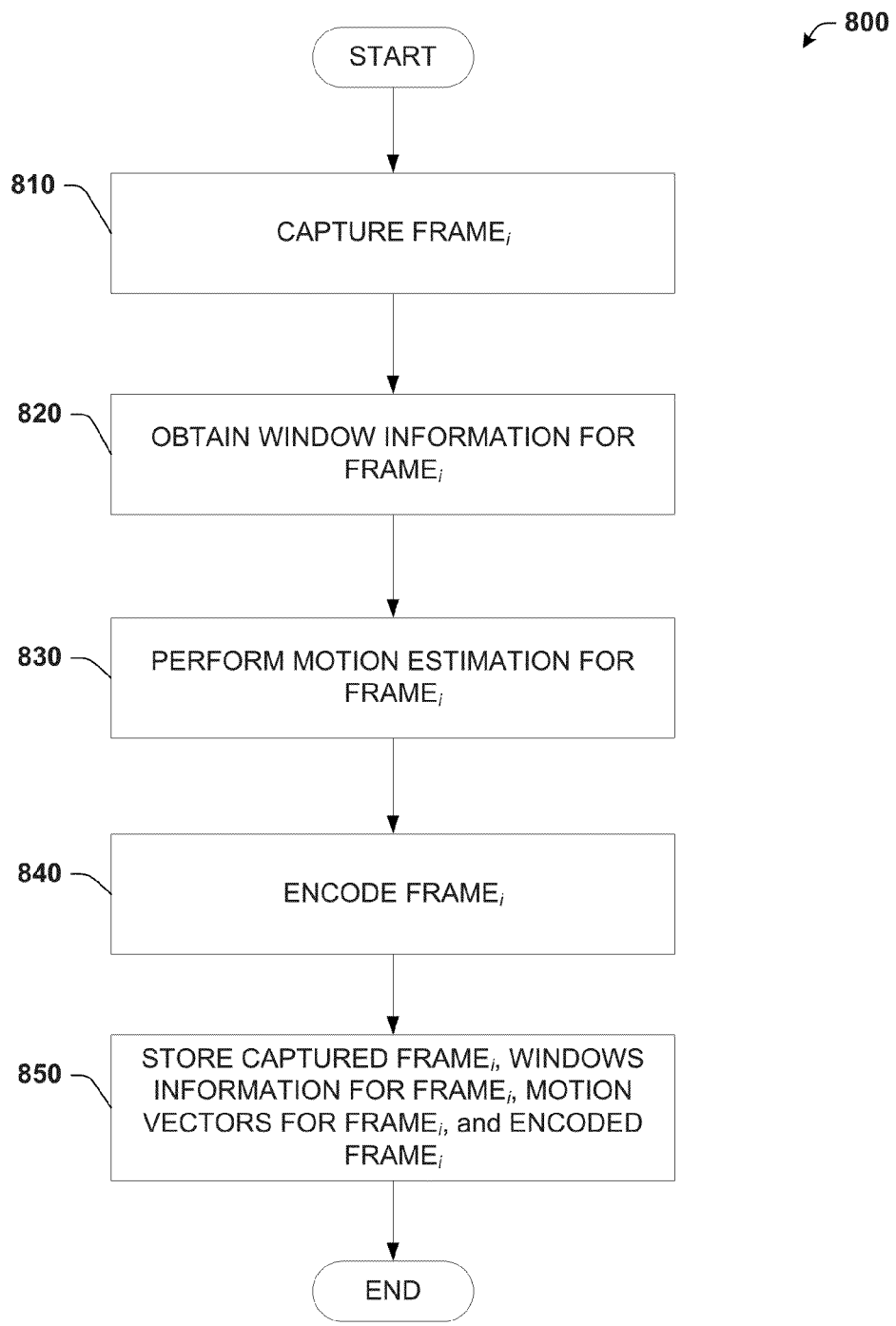
FIG. 8 is an exemplary non-limiting flow diagram for capturing and encoding an additional frame.

Referring to FIG. 8, an exemplary method 800 for capturing and encoding additional frame i is depicted. The method 800 may be employed at, for example, 630 in method 600. At reference numeral 810, an additional frame i, where i is an integer, is captured from the remote desktop (e.g., using window analyzing component 120). At reference numeral 820, windows information for windows in the additional frame i is determined (e.g., using window analyzing component 120). At reference number 830, motion estimation is performed for all motion compensation units 1 to k, where k is an integer, in additional captured frame i against one or more reference frames j, where j is an integer, for example, using a windows based motion estimation algorithm such as disclosed with reference to FIGS. 9A and 9B (e.g., using motion estimation component 150). At reference numeral 840, the additional captured frame i is encoded (e.g., using encoder component 170). At reference numeral 850, the captured frame i, windows information for frame i, motion vectors for frame i, the encoded frame i, possibly along with a reconstructed frame i are tracked and stored (e.g., using tracking component 130 and data store 140).

Figure 9A:
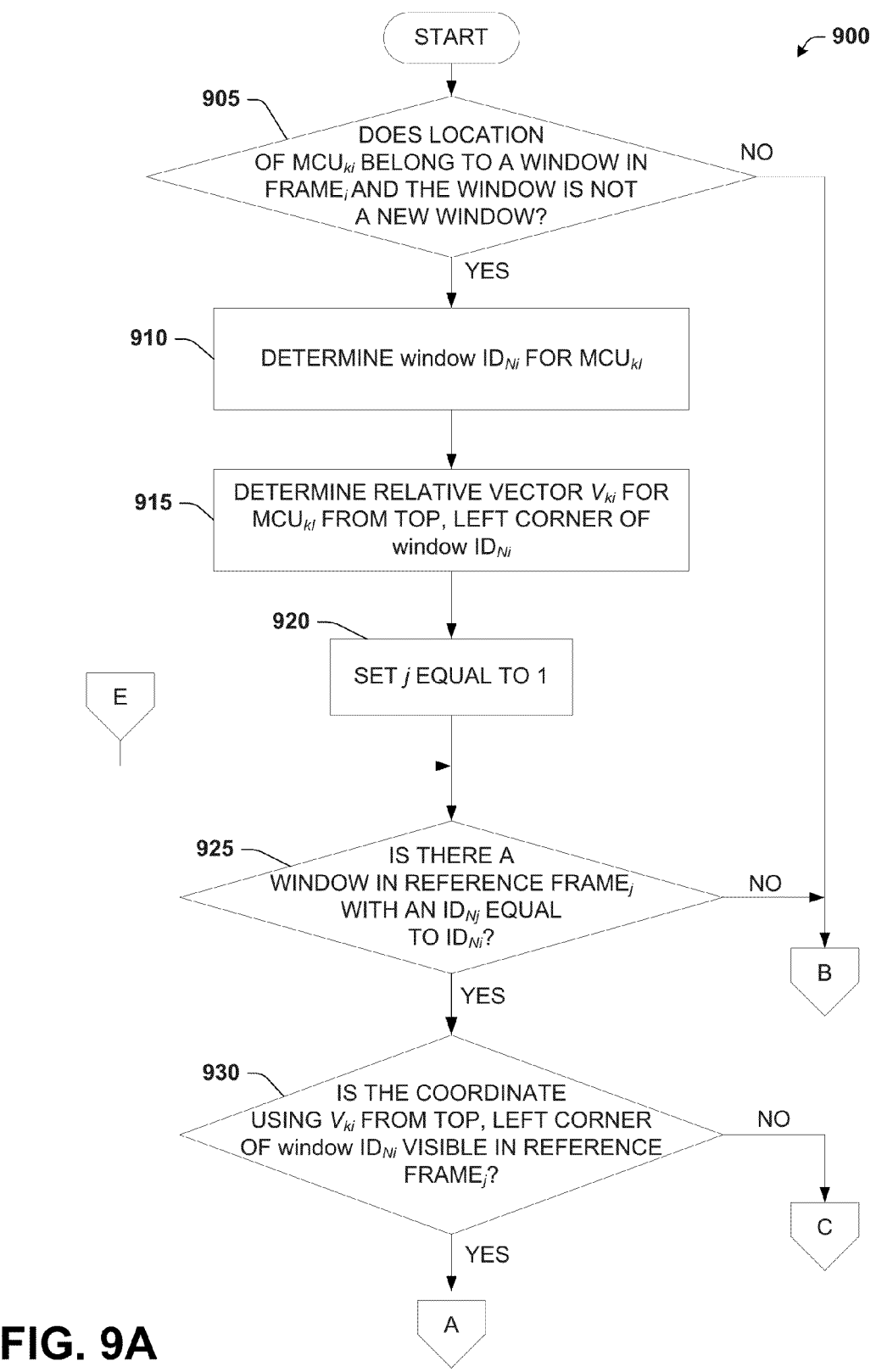
FIGS. 9A and 9B are an exemplary non-limiting flow diagram for estimating motion for a motion compensation unit based upon knowledge of windows in a frame.
Figure 9B:
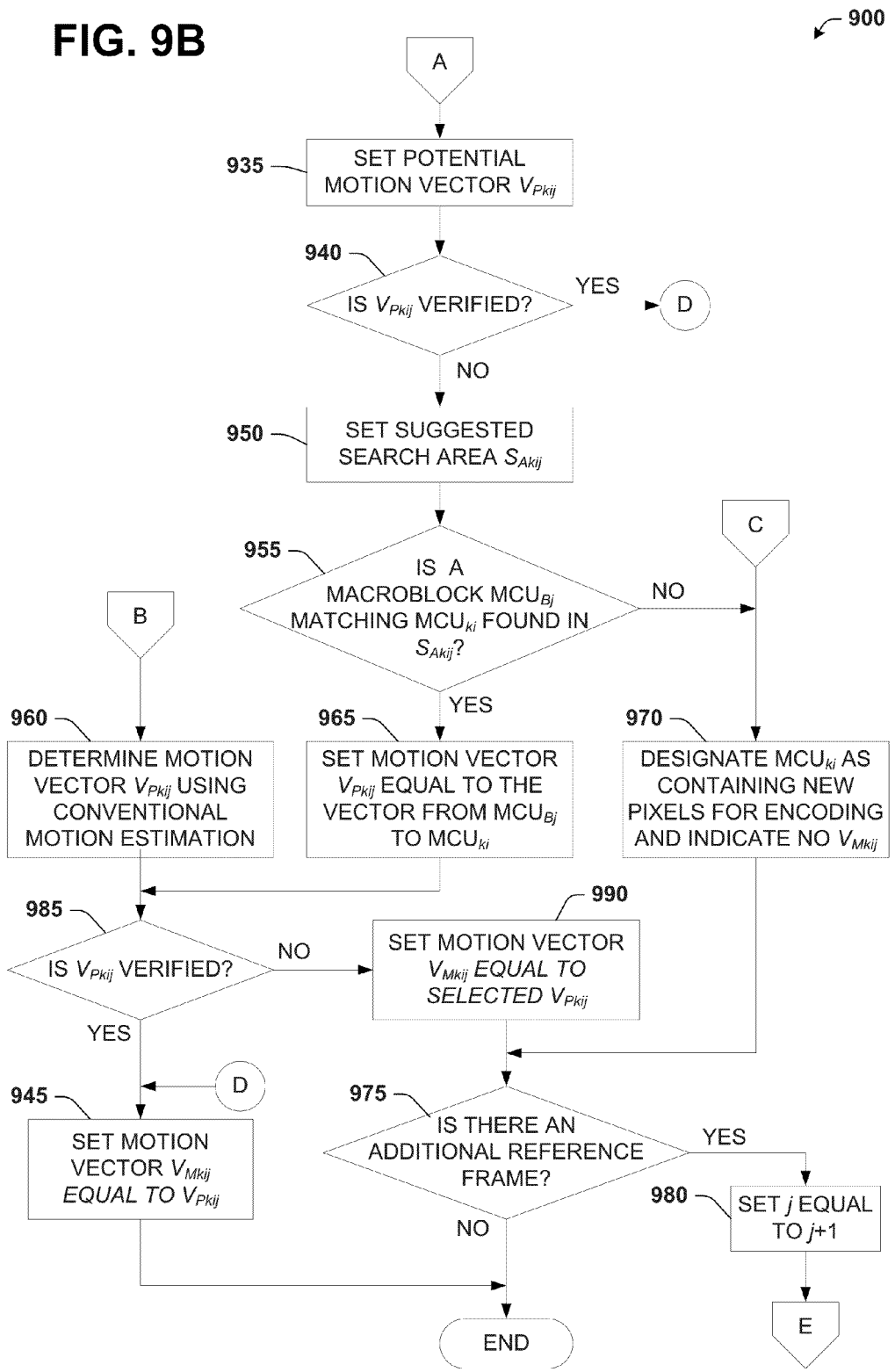

Referring to FIGS. 9A and 9B, an exemplary method 900 for estimating motion for a motion compensation unit k based upon knowledge of windows in frame i (window based motion estimation algorithm). The operations at reference numerals 905, 910, 915, 920, 925, 930, 935, 940, 945, 950, 955, 960, 965, 970, 975, 980, 985, and 990 can be performed using, for example, motion estimation component 150. Coordinates and vectors discussed herein generally employ a common coordinate system across all frames (e.g., captured frame, reconstructed frame, reference frame, and reconstructed reference frame, etc.). At reference numeral 905, a determination is made whether the location of motion compensation unit k of frame i ($MCU_{ki}$) belongs to a window in frame i ($FRAME_i$) that is not a new window? If the determination is false "NO", then the method proceeds to reference numeral 960. If the determination is true "YES" then the method proceeds to reference numeral 910.

At reference numeral 910, the $ID_{Ni}$ for window N in $FRAME_i$ in which $MCU_{ki}$ is located is determined. For example, this information can be retrieved based upon the coordinate position of $MCU_{ki}$ and windows information associated with $FRAME_i$. At reference numeral 915, a relative vector $V_{ki}$ for $MCU_{ki}$ is determined indicating the vector from the top left corner coordinate position ($LEFT_{Ni}$, $TOP_{Ni}$) of window $ID_{Ni}$ to the (x,y) coordinate position of $MCU_{ki}$. At reference numeral 920,j, where j is an integer, is set equal to a value, e.g., 1 indicating the first reference frame j ($FRAME_j$). In one implementation, j is set to a value indicating a reference frame prior to the determination at 905.

At reference numeral 925, a determination is made whether there is a window in reference $FRAME_j$ that has an identifier $ID_{Nj}$ that is equivalent to $ID_{Ni}$. If the determination is false "NO", meaning that reference $FRAME_i$ does not contain a window that is the same window in which $MCU_{ki}$ is located in $FRAME_i$, then the method proceeds to reference numeral 960. If the determination is true "YES", then the window in which $MCU_{ki}$ is located in $FRAME_i$ is also in reference $FRAME_j$ and the method proceeds to reference numeral 930.

At reference numeral 930, a determination is made using relative vector $V_{ki}$ and $ZORDER_{Nj}$ as to whether a coordinate position in reference $FRAME_j$ a distance $V_{ki}$ from the top, left corner ($LEFT_{Nj}$, $TOP_{Nj}$) of window $ID_{Nj}$ is visible. If the determination is false "NO", meaning that the coordinate position is not visible, for example, because that location in window $ID_{Nj}$ is obstructed by another window, then the method proceeds to reference numeral 970. If the determination is true "YES" meaning that the coordinate position is visible, then the method proceeds to reference numeral 935.

At reference numeral 935, a potential motion vector $V_{Pkij}$ from reference $FRAME_j$ to $FRAME_i$ for $MCU_{ki}$ is set equal to a vector from the top left corner coordinate position ($LEFT_{Ni}$, $TOP_{Ni}$) of window $ID_{Ni}$ to the top, left corner ($LEFT_{Nj}$, $TOP_{Nj}$) of window $ID_{Nj}$.

At reference numeral 940, a determination is made whether $V_{Pkij}$ is verified by comparing a macroblock ($MCU_{Bj}$) in reference $FRAME_j$ at a coordinate location a distance $V_{Pkij}$ from the (x,y) coordinate location of $MCU_{ki}$ to $MCU_{ki}$. The comparison determines whether $MCU_{Bj}$ matches $MCU_{ki}$. It is to be appreciated that the potential motion vector $V_{Pkij}$ can be verified using a raw reference frame j or an associated reconstructed reference frame j. In an embodiment, using the reconstructed reference frame j for the verification may not result in an exact match, and thus a decision needs to be made as to whether $V_{Pkij}$ is adequate for encoding. For example, because $MCU_{ki}$. comes from a captured frame $FRAME_i$ that is raw which is compared to $MCU_{Bj}$ from a reconstructed reference frame j, the raw contents of the motion compensation unit $MCU_{ki}$. may not exactly match the reconstructed contents of the macroblock $MCU_{Bj}$. This decision can be based, for example, on a threshold defined in the encoder that can be based on display quality, performance, or other criteria. If the determination is true "YES" meaning that $V_{Pkij}$ is verified, then the method proceeds to reference numeral 945. If the determination is false "NO" meaning that $V_{Pkij}$ is not verified, then the method proceeds to reference numeral 950.

At reference numeral 950, a suggested search area $S_{Akij}$ for $MCU_{ki}$ within reference $FRAME_j$ is set equal to the area within the window $ID_{Nj}$ boundary ($TOP_{Nj}$, $LEFT_{Nj}$, $RIGHT_{Nj}$, $BOTTOM_{Nj}$) minus any portion of window $ID_{Nj}$ that is not visible in reference $FRAME_j$ based upon $ZORDER_{Nj}$. For example, window $ID_{Nj}$ may be partially obstructed from view by other windows in reference $FRAME_j$. As such, window information for the other windows can be used to determine which portion of window $ID_{Nj}$ is obstructed by the other windows and this portion would be excluded when determining the suggested search area.

At reference numeral 955, a determination is made whether a macroblock $MCU_{Bj}$ within the suggested search area $S_{Akij}$ matches $MCU_{ki}$. If the determination is false "NO", meaning that a $MCU_{Bj}$ was not found within $S_{Akij}$ that matches $MCU_{ki}$, the method proceeds to reference numeral 970. If the determination is true "YES", meaning that a $MCU_{Bj}$ was found within $S_{Akij}$ that matches $MCU_{ki}$, the method proceeds to reference numeral 965.

At reference numeral 965, the potential motion vector $V_{Pkij}$ from reference $FRAME_j$ to $FRAME_i$ for $MCU_{ki}$ is set equal to a vector from the coordinate position of the matching $MCU_{Bj}$ to the coordinate position of $MCU_{ki}$ and the method proceeds to reference numeral 985.

At reference numeral 960, conventional motion estimation techniques are employed to perform motion estimation for $MCU_{ki}$ with respect to reference $FRAME_j$ to determine a potential motion vector $V_{Pkij}$. Non-limiting examples of conventional motion estimation techniques can include full search or coarse-to-fine search. However, other conventional motion estimation techniques known to those skilled in the art are within the scope of this method. The method then proceeds to reference number 985.

At reference numeral 970, $MCU_{ki}$ is tagged as containing new pixels for encoding and an indication is made for $MCU_{ki}$ that there is no $V_{Mkij}$ from reference $FRAME_j$ to $FRAME_i$ for $MCU_{ki}$. The method proceeds to reference numeral 975.

At reference number 985, a determination is made whether $V_{Pkij}$ is verified by comparing a macroblock ($MCU_{Bj}$) in reference $FRAME_j$ at a coordinate location a distance $V_{Pkij}$ from the (x,y) coordinate location of $MCU_{ki}$ to $MCU_{ki}$. The comparison determines whether $MCU_{Bj}$ matches $MCU_{ki}$. It is to be appreciated that the potential motion vector $V_{Pkij}$ can be verified using a raw reference frame j or an associated reconstructed reference frame j. In an embodiment, using the reconstructed reference frame j for the verification may not result in an exact match, and thus a decision is made as to whether $V_{Pkij}$ is adequate for encoding. For example, in that embodiment, because $MCU_{ki}$. comes from a captured frame $FRAME_i$ that is raw which is compared to $MCU_{Bj}$ from a reconstructed reference frame j, the raw contents of the motion compensation unit $MCU_{ki}$. may not exactly match the reconstructed contents of the macroblock $MCU_{Bj}$. This decision can be based, for example, on a threshold defined in the encoder that can be based on display quality, performance, or other criteria. If the determination is true "YES" meaning that $V_{Pkij}$ is verified, then the method proceeds to reference number 945. If the determination is false "NO" meaning that $V_{Pkij}$ is not verified, then the method proceeds to reference numeral 990.

At reference numeral 945, the motion vector $V_{Mkij}$ from reference $FRAME_j$ to $FRAME_i$ for $MCU_{ki}$ is set equal $V_{Pkij}$ and the method ends. At reference numeral 990, a motion vector is selected from the unverified potential motion vectors $V_{Pkij}$, for reference frames 1 to j that has a corresponding $MCU_{Bj}$ in reference $FRAME_j$ at a coordinate location a distance $V_{Pkij}$ from the (x,y) coordinate location of $MCU_{ki}$ that is a closest match to $MCU_{ki}$, for example, as defined by the encoder. The selected potential motion vector $V_{Pkij}$ is set as the motion vector $V_{Mkij}$ from reference $FRAME_j$ to $FRAME_i$ for $MCU_{ki}$.

At reference numeral 975, a determination is made whether there is an additional reference frame for which motion estimation needs to be performed for $MCU_{ki}$. If the determination if false "NO", meaning there are no additional reference frames for $MCU_{ki}$, then the method ends. If the determination if true "YES", meaning there are additional reference frames for $MCU_{ki}$, then the method proceeds to reference numeral 980. At reference numeral 980j is set equal to j+1 to indicate the next reference frame for $MCU_{ki}$ and the method proceeds to reference numeral 925.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 10:
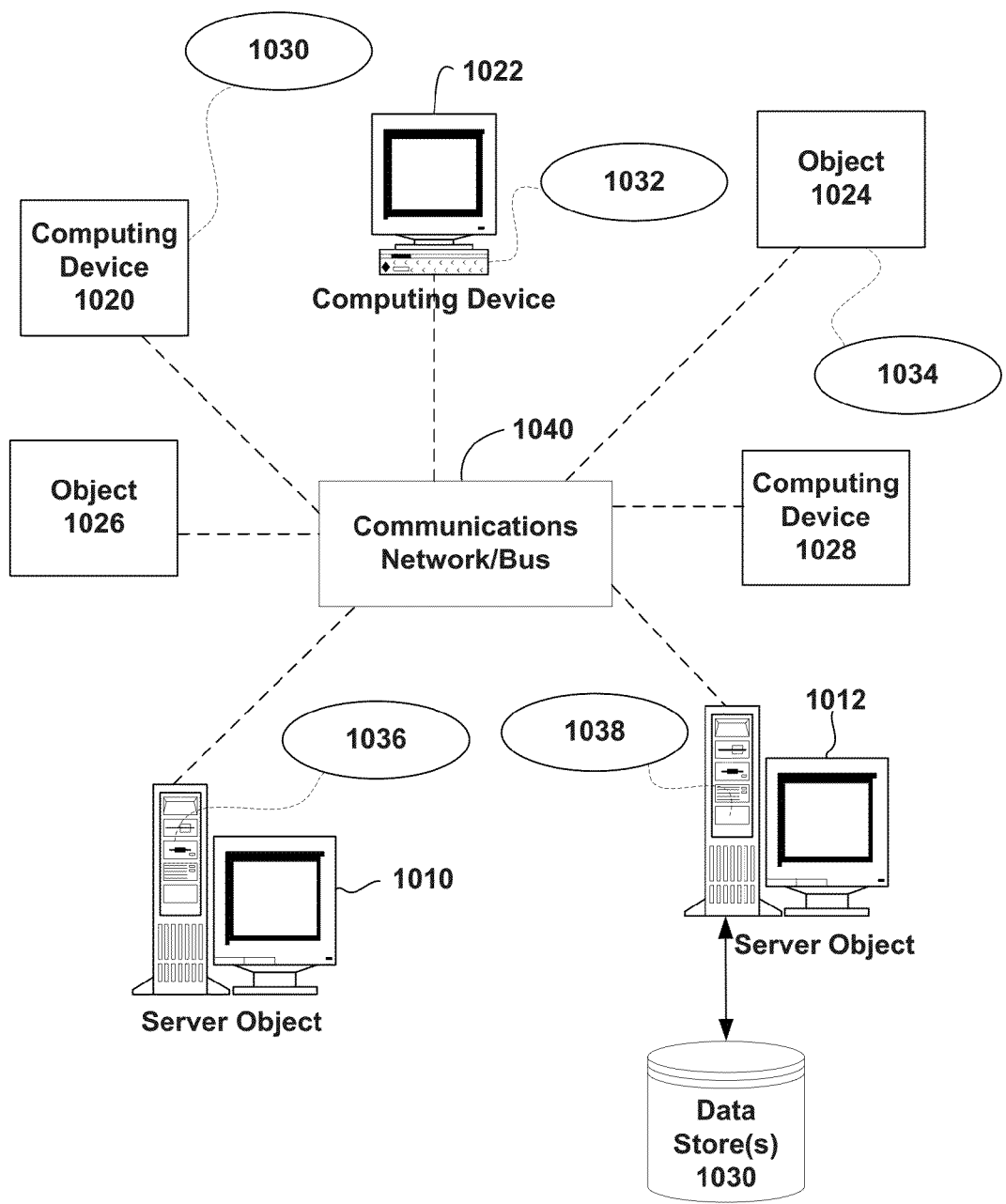
FIG. 10 is a block diagram representing an exemplary non-limiting networked environment in which the various embodiments can be implemented.

FIG. 10 provides a schematic diagram of an exemplary networked or distributed computing environment. The distributed computing environment comprises computing objects 1010, 1012, etc. and computing objects or devices 1020, 1022, 1024, 1026, 1028, etc., which may include programs, methods, data stores, programmable logic, etc., as represented by applications 1030, 1032, 1034, 1036, 1038. It can be appreciated that computing objects 1010, 1012, etc. and computing objects or devices 1020, 1022, 1024, 1026, 1028, etc. may comprise different devices, such as personal digital assistants (PDAs), audio/video devices, mobile phones, MP3 players, personal computers, laptops, tablets, etc.

Each computing object 1010, 1012, etc. and computing objects or devices 1020, 1022, 1024, 1026, 1028, etc. can communicate with one or more other computing objects 1010, 1012, etc. and computing objects or devices 1020, 1022, 1024, 1026, 1028, etc. by way of the communications network 1040, either directly or indirectly. Even though illustrated as a single element in FIG. 10, network 1040 may comprise other computing objects and computing devices that provide services to the system of FIG. 10, and/or may represent multiple interconnected networks, which are not shown. Each computing object 1010, 1012, etc. or computing objects or devices 1020, 1022, 1024, 1026, 1028, etc. can also contain an application, such as applications 1030, 1032, 1034, 1036, 1038, that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 10, as a non-limiting example, computing objects or devices 1020, 1022, 1024, 1026, 1028, etc. can be thought of as clients and computing objects 1010, 1012, etc. can be thought of as servers where computing objects 1010, 1012, etc. provide data services, such as receiving data from client computing objects or devices 1020, 1022, 1024, 1026, 1028, etc., storing of data, processing of data, transmitting data to client computing objects or devices 1020, 1022, 1024, 1026, 1028, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 1040 is the Internet, for example, the computing objects 1010, 1012, etc. can be Web servers, file servers, media servers, etc. with which the client computing objects or devices 1020, 1022, 1024, 1026, 1028, etc. communicate via any of a number of known protocols, such as the hypertext transfer protocol (HTTP). Objects 1010, 1012, etc. may also serve as client computing objects or devices 1020, 1022, 1024, 1026, 1028, etc., as may be characteristic of a distributed computing environment.

Exemplary Computing Device

As mentioned, advantageously, the techniques described herein can be applied to any suitable device. It is to be understood, therefore, that handheld, portable and other computing devices and computing objects of all kinds are contemplated for use in connection with the various embodiments. Accordingly, the below computer described below in FIG. 11 is but one example of a computing device. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 11 thus illustrates an example of a suitable computing system environment 1100 in which one or aspects of the embodiments described herein can be implemented, although as made clear above, the computing system environment 1100 is only one example of a suitable computing environment and is not intended to suggest any limitation as to scope of use or functionality. Neither is the computing environment 1100 be interpreted as having any dependency or requirement relating to any one or combination of components illustrated in the exemplary operating environment 1100.

With reference to FIG. 11, an exemplary computing device for implementing one or more embodiments in the form of a computer 1110 is depicted. Components of computer 1110 may include, but are not limited to, a processing unit 1120, a system memory 1130, and a system bus 1122 that couples various system components including the system memory to the processing unit 1120.

Computer 1110 typically includes a variety of computer readable media and can be any available media that can be accessed by computer 1110. The system memory 1130 may include computer storage media in the form of volatile and/or nonvolatile memory such as read only memory (ROM) and/or random access memory (RAM). By way of example, and not limitation, system memory 1130 may also include an operating system, application programs, other program modules, and program data.

A user can enter commands and information into the computer 1110 through input devices 1140, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 1110. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A system, comprising:
   a non-transitory computer readable medium that has stored thereon computer executable components;
   a microprocessor that, while executing a remote desktop sharing application, executes the following computer executable components stored in the non-transitory computer readable medium:
      a window analyzing component that identifies respective location, size, and z-order of at least one window captured in a frame;
      a tracking component that tracks relocation or re-sizing of the at least one window over a plurality of frames; and
      a motion estimation component that:
         determines whether at least one motion compensation unit to be encoded is within the at least one window,
         determines whether the at least one window is visible within the frame,
         upon determining the at least one motion compensation unit is within the at least one window and the at least one window is visible within the frame, estimates motion of the at least one motion compensation unit based on a matched motion compensation unit within a previously encoded window corresponding to the at least one window, and
         upon determining the at least one motion compensation unit is within the at least one window and the at least one window is not visible within the frame, skipping motion estimation of the at least one motion compensation unit.

2. The system of claim 1, wherein the motion estimation component employs a change over a plurality of captured frames in size, location, or z-order of the at least one window in connection with motion estimation of the at least one motion compensation unit.

3. The system of claim 1, wherein the window analyzing component determines whether the at least one window is a new window in the frame.

4. The system of claim 3, wherein the motion estimation component determines whether the at least one motion compensation unit is located within a boundary of a window in the frame that is not a new window.

5. The system of claim 4, wherein the motion estimation component determines a potential motion vector within a reference frame based upon at least one of a size, a location, or a z-order of a window in the reference frame corresponding to the window in the frame in which the at least one motion compensation unit is located.

6. The system of claim 5, wherein the potential motion vector is a vector from a coordinate of a top left corner of the window in the reference frame to a coordinate of the top left corner of the window in the frame.

7. The system of claim 5, wherein the motion estimation component verifies the potential motion vector by examining a raw reference frame for a macroblock matching the at least one motion compensation unit.

8. The system of claim 5, wherein the motion estimation component verifies the potential motion vector by examining a reconstructed reference frame for a macroblock matching the at least one motion compensation unit.

9. The system of claim 4, wherein the motion estimation component determines a suggested search area within a reference frame based upon at least one of a size, a location, or a z-order of a window in the reference frame corresponding to the window in the frame in which the at least one motion compensation unit is located.

10. The system of claim 9, wherein the suggested search area is an area defined by the boundary of a visible portion of the window in the reference frame.

11. The system of claim 1, wherein the tracking component does not track windows that are not at least partially visible in the frame.

12. A method, comprising:
   using a processor, while executing a remote desktop sharing application, to execute computer executable instructions stored on a non-transitory computer readable medium to perform the following acts:
      identifying respective location, size, and z-order of at least one window captured in a frame;
      tracking relocation or re-sizing of the at least one window over a plurality of frames;
      determining whether at least one motion compensation unit to be encoded is within the at least one window;
      determining whether the at least one window is visible within the frame;
      upon determining the at least one motion compensation unit is within the at least one window and the at least one window is visible within the frame, estimating motion of the at least one motion compensation unit based on a matched motion compensation unit within a previously encoded window corresponding to the at least one; and
      upon determining the at least one motion compensation unit is within the at least one window and the at least one window is not visible within the frame, skipping motion estimation of the at least one motion compensation unit.

13. The method of claim 12, comprising employing a change over a plurality of captured frames in size, location, or z-order of the at least one window in connection with motion estimation of the at least one motion compensation unit.

14. The method of claim 12, comprising determining whether the at least one window is a new window in the frame.

15. The method of claim 14, comprising determining whether the at least one motion compensation unit is located within a boundary of a window in the frame that is not a new window.

16. The method of claim 15, comprising determining a potential motion vector within a reference frame based upon at least one of a size, a location, or a z-order of a window in the reference frame corresponding to the window in the frame in which the at least one motion compensation unit is located.

17. The method of claim 16, wherein the potential motion vector is a vector from a coordinate of a top left corner of the window in the reference frame to a coordinate of the top left corner of the window in the frame.

18. The method of claim 17, comprising verifying the potential motion vector by examining a raw reference frame for a macroblock matching the at least one motion compensation unit.

19. The method of claim 17, comprising verifying the potential motion vector by examining a reconstructed reference frame for a macroblock matching the at least one motion compensation unit.

20. The method of claim 15, comprising determining a suggested search area within a reference frame based upon at least one of a size, a location, or a z-order of a window in the reference frame corresponding to the window in the frame in which the at least one motion compensation unit is located.

21. The method of claim 20, wherein the suggested search area is an area defined by the boundary of a visible portion of the window in the reference frame.

22. The method of claim 12, comprising excluding from the tracking windows that are not at least partially visible in the frame.

23. A non-transitory computer-readable storage medium having instructions stored thereon that, in response to execution by a processor, cause at least one device to perform operations comprising:
    identifying respective location, size, and z-order of at least one window captured in a frame;
    tracking relocation or re-sizing of the at least one window over a plurality of frames;
    determining whether at least one motion compensation unit to be encoded is within the at least one window;
    determining whether the at least one window is visible within the frame;
    upon determining the at least one motion compensation unit is within the at least one window and the at least one window is visible within the frame, estimating motion of the at least one motion compensation unit based on a matched motion compensation unit within a previously encoded window corresponding to the at least one window; and
    upon determining the at least one motion compensation unit is within the at least one window and the at least one window is not visible within the frame, skipping motion estimation of the at least one motion compensation unit.

\* \* \* \* \*